United States Patent [19]

Ganguly et al.

[11] 3,920,629

[45] Nov. 18, 1975

[54] DESEVERNITROSE EVERNINOMICINS AND METHOD FOR THEIR MANUFACTURE

[75] Inventors: Ashit K. Ganguly, Upper Montclair; Olga Sarre, Verona; Sol Szmulewicz, Hazlet, all of N.J.

[73] Assignee: Schering Corporation, Kenilworth, N.J.

[22] Filed: Sept. 30, 1974

[21] Appl. No.: 510,837

Related U.S. Application Data

[63] Continuation-in-part of Ser. No. 398,609, Sept. 19, 1973, abandoned.

[52] U.S. Cl. .......... 260/210 AB; 424/180; 424/181; 260/210 R
[51] Int. Cl.² ........................................ C07C 15/00
[58] Field of Search................. 260/210 AB, 210 R

[56] References Cited

OTHER PUBLICATIONS

Ganguly et al, "Chem. Abst." Vol. 70, 1969, pp. 58164(t).

*Primary Examiner*—Johnnie R. Brown
*Attorney, Agent, or Firm*—Mary S. King

[57] ABSTRACT

Everninomicin derivatives having a nitroso function (e.g. everninomicins B, C and D) upon treatment with a trisubstituted, trivalent phosphorus reagent (e.g. triphenyl phosphine or triethyl phosphite) are converted to novel desevernitrose everninomicin derivatives. Described are desevernitrose everninomicins B, C and D and pharmaceutically acceptable salts thereof which possess antibacterial activity.

13 Claims, No Drawings

DESEVERNITROSE EVERNINOMICINS AND METHOD FOR THEIR MANUFACTURE

CROSS REFERENCE TO RELATED APPLICATIONS

This application is a continuation-in-part of copending application Ser. No. 398,609 filed Sept. 19, 1973, now abandoned.

FIELD OF INVENTION

This invention relates to novel compositions of matter and to processes for their preparation.

More specifically, this invention relates to everninomicin derivatives devoid of an evernitrose sugar substituent and to salts thereof which exhibit antibacterial properties, and to methods for their preparation.

In particular, this invention relates to antibacterials selected from the group consisting of desevernitrose everninomicin B, desevernitrose everninomicin C, desevernitrose everninomicin D and pharmaceutically acceptable salts of the foregoing, to methods for preparing the foregoing antibacterials and salts thereof and to pharmaceutical compositions comprising the foregoing antibacterials and salts thereof and to the method of using said compositions to elicit an antibacterial response.

PRIOR ART

Described in copending application Ser. No. 411,548 filed Oct. 31, 1973 as a continuation-in-part of Ser. No. 377,344, filed July 9, 1973, now abandoned, of Ashit K. Ganguly and Olga Sarre entitled REDUCTION PRODUCTS OF EVERNINOMICINS AND METHODS FOR THEIR MANUFACTURE are derivatives of everninomicins B, C and D wherein the nitro group in the evernitrose sugar therein has been converted to a nitroso function, said derivatives being nitrosoeverninomicins B, C and D. By our invention we have discovered that when nitrosoeverninomicins B, C and D are treated with a tri-substituted trivalent phosphorous reagent such as triphenyl phosphine or triethyl phosphite, rearrangement and cleavage of the evernitrose sugar group derivative therein occurs and there are produced novel antibacterial agents devoid of an evernitrose sugar, specifically, desevernitrose everninomicins B, C and D, respectively.

GENERAL DESCRIPTION OF THE INVENTION

Process Aspect

The process of this invention comprises treating a nitrosoeverninomicin antibacterial derivative having an evernitrose group in which the nitro group has been converted to nitroso, with a tri-substituted, trivalent phosphorus reagent selected from the group consisting of a tri-hydrocarbon phosphine and a tri-hydrocarbon phosphite whereby there is produced the corresponding novel desevernitrose everninomicin derivative having antibacterial properties.

Nitrosoeverninomicin antibacterials useful as starting compounds in our process include nitrosoeverninomicins B, C and D which are described in copending application Ser. No. 411,548 filed Oct. 31, 1973 of Ashit K. Ganguly and Olga Sarre for REDUCTION PRODUCTS OF EVERNINOMICINS AND METHODS FOR THEIR MANUFACTURE and which are represented by the following formula I:

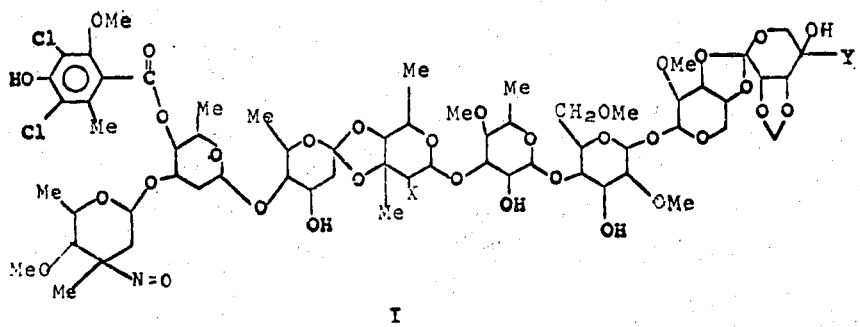

I wherein X is a member selected from the group consisting of hydrogen and hydroxyl, and Y is a member selected from the group consisting of

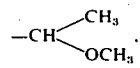

and hydrogen provided X is hydrogen.

Nitrosoeverninomicin B is a compound of formula I wherein X is hydroxy and Y is

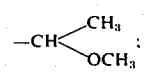

nitrosoeverninomicin C is a compound of formula I wherein X and Y are hydrogen, and nitrosoeverninomicin D is a compound of formula I wherein X is hydrogen and Y is

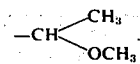

The nitrosoeverninomicin starting compounds defined by formula I are, in turn, prepared from the corresponding everninomicin antibiotics (produced by *Micromonospora carbonacea var. carbonacea* and a variant thereof, *Micromonospora carbonacea var. auranticea* under submerged aerobic fermentation conditions described in U.S. Pat. No. 3,499,078) by reduction thereof with aluminum amalgam in aqueous ethanol followed by separation of the thereby formed mixture of hydroxylaminoeverninomicin and nitrosoeverninomicin. Alternatively, and preferably, the nitrosoeverninomicins B, C and D are prepared by oxidizing the corresponding hydroxylaminoeverninomicins B, C and D with an alkali metal hypobromite in an aprotic solvent, e.g. by means of sodium hypobromite in tetrahydrofuran.

Our process whereby a nitrosoeverninomicin antibacterial agent, upon treatment with a tri-hydrocarbon-substituted trivalent phosphorus reagent is converted to a desevernitrose everninomicin antibacterial is conveniently carried out in an aromatic hydrocarbon solvent (e.g. toluene, xylene, benzene) at their reflux temperatures, preferably under an inert atmosphere such as argon or nitrogen.

Trivalent tri-hydrocarbon-substituted phosphorus reagents useful in our process include trihydrocarbon phosphines and trihydrocarbon phosphites wherein said hydrocarbon substituent may be an alkyl, aryl, aralkyl or alkaryl radical and halogen substituted derivatives thereof, preferably having up to 8 carbon atoms. Typical tri-substituted phosphines useful in our process include: ethyl-diphenyl phosphine, tris(chloromethyl)-phosphine, tri-ethyl phosphine, tri-methyl phosphine, tris(tri-chloromethyl)phosphine, tris(tri-fluoromethyl)-phosphine, and, preferably, tri-phenyl phosphine.

Useful tri-substituted phosphite reagents include tri-butyl phosphite, tri-isopropyl phosphite, tri-methyl phosphite, tri-phenyl phosphite, tri-propyl phosphite, tri(2-tolyl)-phosphite, tri(4-tolyl)-phosphite, tris(2,2,2-tri-chloroethyl)-phosphite, and preferably, tri-ethyl phosphite.

Of the foregoing reagents, triphenyl phosphine is preferred because of its ease of handling, since it is a solid.

Moreover, during our process, triphenyl phosphine is converted to triphenyl phosphine oxide which is easily separated from the desevernitrose everninomicin antibacterials via the usual purification techniques, particularly by chromatographic methods.

A convenient method of carrying out the process of this invention comprises preparing a solution of nitrosoeverninomicin (e.g. nitrosoeverninomicin D) in benzene and, after bubbling an inert gas (e.g. nitrogen) through the solution and while keeping the solution under an inert atmosphere, adding at least an equimolar quantity of a triarylphosphine (preferably triphenyl phosphine), the molar quantity of triaryl phosphine preferably being in about at least a 10% excess to the molar quantity of nitrosoeverninomicin. For example, about 1.1 moles of triphenyl phosphine per mole of nitrosoeverninomicin D are usually used when carrying out our process (when a trialkyl phosphite is used as reagent, about 3 moles of phosphite reagent is usually employed per mole of nitrosoeverninomicin). The reaction solution is then heated at reflux temperature (usually at temperatures in the range of from about 80° to about 140°C) until thin layer chromatographic analysis of an aliquot of the reaction mixture indicates the absence of starting nitrosoeverninomicin (usually about 1 to 2 hours). The desevernitrose everninoninomicin product (e.g. desevernitrose everninomicin D) is then isolated by evaporating the reaction mixture in vacuo, dissolving the residue in an aryl hydrocarbon solvent (e.g. benzene), chromatographing the solution, usually on a silica gel column eluting with acetone:ethyl acetate (1:9), combining the like fractions containing the desevernitrose everninomicin product as determined by thin layer chromatography, and evaporating the combined fractions to a residue comprising the desevernitrose everninomicin product, further purification of which can be effected by usual techniques such as chromatography, recrystallization, reprecipitation and extraction techniques.

GENERAL DESCRIPTION OF THE COMPOSITION OF MATTER ASPECT OF THE INVENTION

Included within the composition-of-matter aspect of this invention are desevernitrose everninomicin antibacterial derivatives selected from the group consisting of desevernitrose everninomicin B, desevernitrose everninomicin C, desevernitrose everninomicin D, and pharmaceutically acceptable salts thereof, said desevernitrose everninomicins being represented by the following formula II:

II wherein X is a member selected from the group consisting of hydrogen and hydroxyl; and Y is a member selected from the group consisting of $$-CH\begin{array}{c}CH_3\\OCH_3\end{array}$$

and hydrogen provided X is hydrogen.

Desevernitrose everninomicin B is a compound of formula II wherein X is hydroxyl and Y is $$-CH\begin{array}{c}CH_3\\OCH_3\end{array}$$

desevernitrose everninomicin C is a compound of formula II wherein X and Y are each hydrogen; and desevernitrose everninomicin D is a compound of formula II wherein X is hydrogen and Y is $$-CH\begin{matrix}CH_3\\OCH_3\end{matrix}$$

The physical embodiments of the desevernitrose everninomicins of formula II are colorless crystalline solids which are soluble in most organic solvents, particularly in hydrocarbons such as benzene, xylene and toluene and in cyclic ethers such as tetrahydrofuran and dioxane, being less soluble in dialkyl ethers such as ethyl ether. As is evident from formula II, the desevernitrose everninomicins of this invention are oligosaccharides, each containing a dichloroisoeverninoyl ester grouping, several anomerically linked monosaccharide groups and two ortho ester functions. It is known that ortho esters hydrolyze readily in an acidic medium. In view of the presence of these functions in our compounds, to minimize side reactions, it is preferable to store them under anhydrous conditions in an inert atmosphere (e.g. under nitrogen, argon, etc.) at low temperatures (i.e. at about 5°–10°C).

The above defined desevernitrose everninomicins contain an acidic phenolic hydroxyl function which is readily convertible to pharmaceutically cationic salts thereof utilizing procedures known in the art. Among the pharmaceutically acceptable cationic salts contemplated for this invention are salts of alkali and alkaline earth metals (e.g. sodium, potassium, calcium, aluminum), and salts with an amine such as a trialkylamine, procaine, dibenzylamine, N-benzylbetaphenethylamine, N,N'-dibenzylethylenediamine, N,N'-bis-dehydroalbietylethylenediamine, and N-(lower)alkylpiperidines, e.g. N-ethylpiperidine. Also included within the term "pharmaceutically acceptable salts" are N-methylglucamine salts of the desevernitrose everninomicins of this invention.

The pharmaceutically acceptable salts of this invention include those which replace the phenolic hydrogen with a cation (e.g. desevernitrose everninomicin D sodium salt) and those wherein the phenolic hydrogen and everninomicin radical form an acid addition salt with an amine (e.g. desevernitrose everninomicin D N-methylglucamine salt).

Among the pharmaceutically acceptable salts of this invention are:
desevernitrose everninomicin D sodium salt
desevernitrose everninomicin C sodium salt
desevernitrose everninomicin B sodium salt
desevernitrose everninomicin D N-methyl glucamine salt
desevernitrose everninomicin C N-methyl glucamine salt
desevernitrose everninomicin B N-methyl glucamine salt The cationic salts (e.g. the sodium salt) are prepared according to known procedures such as by combining equimolar quantities of the corresponding base (e.g. sodium hydroxide) to the desevernitrose everninomicin derivative (e.g. desevernitrose everninomicin D) in water and lyophilizing the resultant solution of the desevernitrose everninomicin D salt. The amine acid addition salts are prepared by combining equimolar quantities of the amine (e.g. N-methyl glucamine) to the desevernitrose everninomicin derivative (e.g. desevernitrose everninomicin D) in a lower alkanol and isolating the salt by evaporating the solvent in vacuo or by precipitation with ether.

The pharmaceutically acceptable salts of our invention are white amorphous solids which are water soluble and form stable aqueous solutions. They are, therefore, a particularly preferred species of our invention since they are a convenient vehicle for administering the desevernitrose everninomicins of our invention.

The desevernitrose everninomicins B, C and D of this invention including the pharmaceutically acceptable salts thereof, particularly the preferred desevernitrose everninomicin D and the sodium and N-methyl glucamine salts thereof, exhibit a narrow spectrum antibacterial activity in vitro against gram-positive bacteria (e.g. *Staphylococcus aureus*, *Staph.* 11631, *Staph. W.*, *Streptococcus pyogenes C*, *Strep. pyogenes C*-203 and *Bacillus subtilis*). Our compounds are thus advantageously employed as laboratory reagents when attempting to determine the presence of enteric gram negative organisms. They may be used to inhibit overgrowth of gram positive organisms in culture media, either alone or in combination with other antibacterial agents to reduce or eliminate the heavy overgrowth of gram-positive organisms permitting the determination of gram-negative organisms such as *Klebsiella pneumoniae* or *Escherichia coli* in cultures obtained in diagnostic procedures. As such reagents they may be employed in solution.

In view of their action against gram-positive organisms, the antibacterials described herein may be used to "sterilize" equipment such as in operating rooms and in hospital wards.

The comparative in vitro activities of desevernitrose everninomicin B and the sodium salt thereof, desevernitrose everninomicin D, the sodium salt and N-methyl glucamine salts thereof, and of nitrosoeverninomicin D and everninomicin D are set forth in Table 1 hereinbelow:

Table I

|  |  | Everninomicin D | Nitrosoeverninomicin D | Desevernitrose Everninomcin D, Sodium Salt, and N-methyl Glucamine Salt | Desevernitrose Everninomicin B, and Sodium Salt |
|---|---|---|---|---|---|
| MIC (mcg/ml)$^a$ |  | 0.03–0.3 | 0.08–0.8 | 0.03–3.0 | 0.3–25 |
| PD$_{50}$$^a$ mg/kg | Oral | 15 |  | >50 |  |
|  | S.C. | 5 |  | 2.5–5.0 |  |
| LD$_{50}$$^a$ in mice | I.P. | >3800 |  |  |  |
| (mg/kg) | S.C. | >3800 |  | >50 |  |
|  | Oral | >3800 |  |  |  |
|  | I.V. | 125 |  |  |  |
| Peak serum levels in dogs (mcg/ml) |  |  |  |  |  |
| 10 mg/kg | I.M. | 2–3 | 6 | 8–10 | 10–15 |
| Peak serum levels in rats (mcg/ml) |  |  |  |  |  |

Table I-continued

|  |  | Everninomicin D | Nitrosoeverninomicin D | Desevernitrose Everninomcin D, Sodium Salt, and N-methyl Glucamine Salt | Desevernitrose Everninomicin B, and Sodium Salt |
|---|---|---|---|---|---|
| 25 mg/kg | S.C. | 10–12 | 10–11 | 10–12 |  |

*" - Staphylococcus and Streptococcus*

In above Table 1, there is also listed in vivo data for the peak serum levels in dogs and rats, as well as $PD_{50}$ and $LD_{50}$ doses in mice for everninomicin D, nitrosoeverninomicin D, desevernitrose everninomicin D, and desevernitrose everninomicin B against *Staphylococcus* and *Streptococcus*.

The acute toxicity ($LD_{50}$) of the antibacterial substances in either aqueous suspensions or aqueous solutions is measured in milligrams per kilogram in standard manner using male CF-1 mice weighing 20 grams.

The protection tests to determine the dose required to protect fifty percent of the animals tested ($PD_{50}$) use groups of seven mice (male albino CF-1 mice, each weighing 18–20 g.) each at five dose levels with 10 mice serving as controls. Mice were each treated with a single subcutaneous or oral dose 1 hour after intraperitoneal infection with approximately $10^7$ organisms. Control mice were generally dead 18–24 hours after infection. Survivors in treated groups were determined 48 hours after infection. Probit procedures were used to determine $PD_{50}$ values in milligrams per kilogram.

In determining peak serum levels, the animal tested (e.g. dog or rat) is given a single dose of 10 or 25 mg./kg. of everninomicin D or derivative thereof, blood samples are taken periodically, and the serum thereof is assayed for antibacterial activity by an agar-diffusionassay as described by Weinstein et al., *Antimicrobial Agents and Chemotherapy*, p 24 (1964).

It is apparent from the foregoing that, when administered by injection in the form of its sodium or N-methyl glucamine salt, desevernitrose everninomicin D exhibits antibacterial activity comparable to that of the parent antibiotic everninomicin D and of the precursor nitrosoeverninomicin D, being particularly effective in inhibiting the growth of gram positive bacteria, and, advantageously, is more rapidly absorbed, producing higher serum levels (i.e. 8–10 mcg/ml) in the dog than that produced by everninomicin D (i.e. 2–3 mcg/ml) or by nitrosoeverninomicin D (i.e. 6 mcg/ml). Therefore, desevernitrose everninomicin D and salts thereof, particularly the sodium and N-methyl glucamine salts, are among the preferred compounds of this invention.

We have discussed in detail the preferred species of our invention relating to desevernitrose everninomicin D derivatives. In similar manner, our invention is carried out to produce antibacterial substances which are desevernitrose derivatives of everninomicin B and everninomicin C. Thus, nitrosoeverninomicins B and C upon treatment with a trihydrocarbon trivalent phosphorus reagent, i.e. triphenyl phosphine, are converted to desevernitrose everninomicins B and C, respectively, having antibacterial activity against gram-positive bacteria. Advantageously, desevernitrose everninomicins B, C and D and pharmaceutically acceptable salts thereof exhibit antibacterial activity against bacteria which are resistant to other antibacterial agents such as penicillin, penicillinase-resistant penicillins, tetracycline, macrolide antibacterials such as erythomycin and lincomycin.

Procedures are set forth hereinbelow to illustrate the best mode contemplated by applicants for carrying out their invention and are not to be construed as limiting the scope thereof.

PREPARATION 1

Preparation, Separation and Purification of Everninomicin B, Everninomicin C, and Everninomicin D A. Preparation of Antibiotic Mixture Comprising Everninomicin B, Everninomicin C, and Everninomicin D In the manner described in U.S. Pat. No. 3,499,078, Example 1, prepare a 500 gallon fermentation broth by cultivating a micro-organism selected from the group consisting of *Micromonospora carbonacea* var. *carbonacea* NRRL 2972 and *Micromonospora carbonacea* var. *Aurantiaca* NRRL 2992 under submerged aerobic conditions in an aqueous nutrient medium containing an assimilable source of carbon and nitrogen. Extract 500 gallons of fermentation broth with 500 gallons of methylene chloride, then concentrate the methylene chloride extracts in vacuo to a residue having a volume of about 3 liters. Pour the residue into 30 liters of hexane, then filter and air dry the resultant precipitate comprising a mixture of everninomicin B, everninomicin C, and everninomicin D.

B. Separation of Antibiotic Mixture

Prepare the chromatographic column by making a slurry of 11.35 kg. of silica gel (Bakers) in benzene/acetone (60:40). Then transfer the slurry into two 5 ft. × 4 in. columns and allow the columns to settle over night. Place the two columns in series so they will act as one continuous column.

Dissolve 300 g. of the mixture of everninomicin B, C and D prepared as described in Preparation 1A in about 1 liter of benzene/acetone (60:40) with vigorous stirring. Transfer this solution onto the columns.

Elute the column (i.e. the two columns in series) with benzene/acetone (60:40) and collect 1800 ml. fractions. Combine like fractions as determined by thin layer chromatographic analysis (silica gel:benzene:acetone (60:40)). Then evaporate the combined fractions to a residue comprising everninomicin D, everninomicin C and everninomicin B, respectively, as follows: Fractions 14–18 yield a residue comprising 76.9 g. of everninomicin D; fraction 21 yields a residue comprising 5 g. of everninomicin C and combined fractions 22–27 yield a residue comprising 29.5 g. of everninomicin B.

C. Purification of Everninomicin D, C, and B, respectively

1. Everninomicin D

Purify the residue of fractions 14–18 obtained in above Preparation 1B in the following manner to obtain purified everninomicin D:

Treat a solution of 66 g. of everninomicin D (prepared as described in paragraph 1 hereinabove) in 300 ml. of acetone with 7 g. of charcoal at room temperature. Filter and wash the charcoal with 100 ml. of acetone. Pour the combined acetone filtrate and washes onto a solution of 10.5 liters of petroleum ether (b.p. 60°C) and 2.7 liters of ethyl ether. Filter and dry the resultant precipitate of everninomicin D.

Further purify the thus obtained everninomicin D (about 56 grams) by reprecipitating an acetone (250 ml.) solution thereof with about 10 liters of a solvent mixture comprising petroleum ether/ethyl ether (4:2). Filter and dry the resultant precipitate of everninomicin D to a constant weight at 60°C.

Further purify 30 g. of the everninomicin D obtained as described above in a minimum amount of acetone, add 120 g. of fresh silica gel, then evaporate the solvent at 60°C until a constant weight is obtained. Add this mixture to the top of a 5 ft. by 1¾ inch chromatographic column charged with 450 g. of silica gel made up in benzene. Elute the column first with about 7 liters of a solvent mixture comprising 15% acetone-85% benzene, followed by elution with a solvent mixture comprising 20% acetone-80% benzene. Collect 1 liter fractions, monitoring the fractions by thin layer chromatography. Concentrate pooled fractions 8–16 in vacuo at 50°C to a residue comprising everninomicin D (about 18g.) having an $R_f$ of 0.79 via thin layer chromatography in a 60% acetone-40% benzene system.

Molecular Formula: $C_{66}H_{99}O_{35}NCl_2$; Molecular Weight: 1537 (calc.);

Specific Optical Rotation: $[\alpha]_D^{26} -34.2°$ (chloroform);

Neutralization Equivalent: 1563 (calc. for $C_{66}H_{99}O_{35}NCl_2$:1537).

pKa: 7.2.

Store everninomicin D under an atmosphere of nitrogen at about 5°C.

2. Everninomicin C

Crystallize the residue of fraction 21 obtained as described in Preparation 1B from ethyl acetate to obtain purified everninomicin C having the following properties:

m.p.: 181°–184°C Kofler block;

Specific Optical Rotation: $[\alpha]_D^{26} -33.7°$ (chloroform); Ultraviolet Absorption: $\lambda_{max}^{methanol}$ 208 m$\mu$, $\epsilon_1'$,19.8; 211 m$\mu$, $\epsilon_1'$,19.5.

Infrared Absorption Spectrum in chloroform: 2.9, 3.4 (broad), 5.75, 6.32, 6.45, 6.85, 7.1, 7.2, 7.4, 7.7, 8.0, 9.0, 9.6, 10.2, and 11.0 microns.

3. Everninomicin B

Chromatograph 28 g. of everninomicin B prepared as described in above Preparation 1B (i.e. the residue from fractions 22 to 27) on 900 g. of silica gel G (TLC Grade; according to Stahl) eluting with 35% acetone in benzene. Collect 20 ml. fractions and combine like fractions as determined by thin layer chromatographic analysis. Evaporate combined fractions 211 to 310 in vacuo to a residue comprising purified everninomicin B (12.6 g.) having the following properties:

Molecular Formula: $C_{66}H_{99}O_{36}NCl_2$; Molecular Weight: 1553 (calc.);

m.p. 184°–185°C Kofler block.

Specific Optical Rotation $[\alpha]_D^{26} -33°$ (chloroform);

Ultraviolet Absorption Spectrum: $\lambda_{max}^{methanol}$ 210 m$\mu$, $\epsilon_1'$,17; 285 m$\mu$, $\epsilon_1'$,1.5.

Infrared Absorption Spectrum (in chloroform): 2.9, 3.4, 5.75, 6.3, 6.45, 6.85, 7.20, 8.0, 8.5, 9.0, 9.6, 10.2, and 10.5 microns.

PREPARATION 2

Nitrosoeverninomicin D

A. preparation of Aluminum Amalgam

To Reynolds Wrap Aluminum Foil (cut into pieces of about 0.5 cm. square), add dilute sodium hydroxide until there is a strong evolution of hydrogen gas. Decant the dilute sodium hydroxide and wash once superficially with water. Decant the water wash and add a 0.5% mercuric chloride solution allowing aluminum to remain in the solution for about 1 to 2 minutes. Decant the mercuric chloride solution. Repeat the entire foregoing procedure, then wash the shiny amalgamated aluminum in turn with water, ethanol, then ether and use immediately in following Preparation 2B.

B. Reduction of Everninomicin D

To a solution of 4.5 g. of everninomicin D (purified as described in Preparation 1C(1) in 100 ml. of 95% ethanol and 85 ml. of water, add with stirring at room temperature aluminum amalgam prepared from 810 mg. of Reynolds Wrap Aluminum Foil as described in Example 1-B. Stir the reaction mixture at room temperature until all the amalgam disappears (approximately 2 hours). Filter the gray reaction mixture on a Buchner funnel using a filter pad and wash the insoluble residue with 95% ethanol. Combine the filtrate and ethanol washings and concentrate to a volume of approximately 100 ml. Cool the concentrate in an ice bath for about an hour; separate by filtration the resulting insoluble fraction comprising 2.9 g. of hydroxylaminoeverninomicin D; dry the insoluble fraction in vacuo at room temperature prior to further purification.

C. Purification of Hydroxylaminoeverninomicin D

Purify the crude hydroxylaminoeverninomicin D (2.9g.) obtained as described in Preparation 2B using 20 silica gel preparative plates (2000 $\mu$ thick) and using 50% acetone in benzene as the developing solvent. Visualize the purified hydroxylaminoeverninomicin D ($R_f$=0.44) using ultraviolet light and extract the purified hydroxylaminoeverninomicin D band (i.e. the 0.45 $R_f$ band) from the plate using acetone. Combine the acetone extracts and distill to a residue comprising 1.5 g. of purified hydroxylaminoeverninomicin D having the following properties:

Molecular Formula: $C_{66}H_{101}O_{34}NCl_2$; Molecular Weight: 1523 (calc.). m.p.: 190°–200°C Kofler block;

Specific optical rotation: $[\alpha]_D^{26} -39.3°$ (chloroform);

Ultraviolet absorption: $\lambda_{max}^{methanol}$ 215 m$\mu$, $\epsilon_1'$,19.2; 292 m$\mu$, $\epsilon_1'$, 3.4.

Infrared absorption spectrum in chloroform: 2.92, 5.80, 6.37, 6.92, 7.13, 7.26, 8.06, (broad), broad absorption between 9.13 and 9.70 microns.

In this specification, when reporting ultraviolet absorption data, by "$\epsilon_1'$," is meant "$\epsilon_1'\%_{cm.}$" which is defined as the optical density of a 1% solution of a compound measured in a 1 centimeter cell.

D. Preparation of Nitrosoeverninomicin D

The reagent sodium hypobromite is prepared according to the procedure described in Organic Synthesis, COLL., Vol. 4, 45 (1963).

To 1 mm. of hydroxylaminoeverninomicin D in tetrahydrofuran solution (1 g. dissolved in 10 ml. of tetrahydrofuran), add 1 mm. of aqueous sodium hypobromite solution at room temperature. Follow the course of the reaction by thin layer chromatography (silica gel plates 250 μ; solvent system acetone/ethyl acetate/benzene [2:2:1]). After the starting material has disappeared, add water to the reaction mixture and extract with methylene chloride. Evaporate the combined methylene chloride extracts to a residue comprising nitrosoeverninomicin D (yield about 60% theory) which is further purified as described hereinbelow.

Chromatograph 100 mg. of nitrosoeverninomicin D on a thin layer chromatographic preparative plate (2000 μ thick) using acetone/ethyl acetate/benzene (2:2:1) as the developing solvent. Visualize the purified nitrosoeverninomicin D by means of ultraviolet light and extract from the plate with acetone the band in the approximate $R_f$ range of 0.75–0.85. Evaporate the combined acetone extracts to a residue comprising about 60 mg. of nitrosoeverninomicin D having the following properties:

Molecular Formula: $C_{66}H_{99}O_{34}NCl_2$; Molecular Weight: 1521 (calc.);
m.p.: 163°–165°C Kofler block;
Specific Optical Rotation: $[\alpha]_D^{26}$ −30.8 (chloroform);
Ultraviolet Absorption Spectrum: $\lambda_{max}^{methanol}$ 212 mμ,$\epsilon_1'$, 16.05; 292 mμ,$\epsilon_1'$, 5.60.
Infrared Absorption Spectrum in chloroform: 2.9, 3.4, 5.8, 6.4, 6.5, 6.9, 7.2, 9.0, 9.6, 10.2, 10.5 microns.
Bioassay: Nitrosoeverninomicin 1460 γ/ml.

PREPARATION 3

Nitrosoevernimonicin C

A. Hydroxylaminoeverninomicin C

1. In a manner similar to that described in Preparation 2B, treat everninomicin C (prepared and purified as described in Preparation 1) in aqueous ethanol with aluminum amalgam. Isolate the resultant product in a manner similar to that described to obtain hydroxylaminoeverninomicin C. 2. Purify the crude hydroxylaminoeverninomicin C obtained as described in above Preparation 3A(1) in a manner similar to that described in Preparation 2C using silica gel preparative plates (2000 μ thick) and using 50% acetone-benzene as the developing solvent. Visualize the purified hydroxylaminoeverninomicin C ($R_f$ = 0.27) with ultraviolet light and extract the purified hydroxylaminoeverninomicin C band from the plate using acetone. Combine the acetone extract and distill to a residue comprising purified hydroxylaminoeverninomicin C having the following properties:

m.p.: 165°–168°C Kofler block;
Specific Optical Rotation: $[\alpha]_D^{26}$ −21.6° (methanol);
Ultraviolet Absorption Spectrum: $\lambda_{max}^{methanol}$ 212 mμ, $\epsilon_1'$, 17.32; $\lambda_{max}^{methanol}$ 290 mμ, $\epsilon_1'$, 3.33.
Infrared Absorption Spectrum (in chloroform): 2.9, 3.4, 5.8, 6.9, 7.2, 8.0, 9.1, 9.6, 10.25, and 11.0 microns.

B. Nitrosoeverninomicin C

In a manner similar to that set forth in Preparation 2D, treat hydroxylaminoeverninomicin C in tetrahydrofuran solution with aqueous sodium hypobromite at room temperature. Isolate and purify the resultant product in a manner similar to that described to obtain nitrosoeverninomicin C.

PREPARATION 4

Nitrosoeverninomicin B

A. Hydroxylaminoeverninomicin B

1. In a manner similar to that described in Preparation 2B, treat everninomicin B (prepared and purified as described in Preparation 1) in aqueous ethanol with aluminum amalgam. Isolate and purify the resultant product in a manner similar to that described in Preparation 2B to obtain a product comprising hydroxylaminoeverninomicin B.

2. In a manner similar to that described in Preparation 2C, purify the crude hydroxylaminoeverninomicin B prepared in above Preparation 4A(1) using silica gel preparative plates (2000 μ thick) and using 50% acetone in benzene as the developing solvent. Visualize the purified hydroxylaminoeverninomicin B ($R_f$=0.18) using ultraviolet light and extract the purified hydroxylaminoeverninomicin B band from the plate using acetone. Combine the acetone extracts and distill to a residue comprising purified hydroxylaminoeverninomicin B having the following properties: Molecular Formula: $C_{66}H_{101}O_{35}NCl_2$; Molecular Weight: 1535 (Calc.);
m.p.: 171°–173°C Kofler block;
Specific Optical Rotation: $[\alpha]_D^{26}$ −19.9 (methanol);

B. Nitrosoeverninomicin B

In a manner similar to that described in Preparation 2D, treat hydroxylaminoeverninomicin B with aqueous sodium hypobromite at room temperature. Isolate and purify the resultant product in a manner similar to that described to obtain nitrosoeverninomicin B.

Infrared Absorption Spectrum: (in chloroform): 2.92, 5.78, 6.48, 6.92, 7.26, 7.77 (weak), 8.02, 8.90, 9.14, 9.66, 10.29, 10.58, 11.05, 11.58, 12.01.

EXAMPLE 1

Desevernitrose Everninomicin D

A. Bubble nitrogen through a solution of 12 grams (0.0079M) of nitrosoeverninomicin D in 300 ml. of benzene. Add 2.3 g.(0.0088M) of triphenyl phosphine and reflux the reaction mixture under nitrogen until thin layer chromatographic analysis of an aliquot indicates the absence of starting compound (about 1.5 hours). Evaporate the reaction mixture in vacuo to a residue. Dissolve the residue in benzene and pour the benzene solution on a silica gel column (500 g.); elute the column with acetone:ethyl acetate (1:9). Collect 10 ml. fractions, following the progress of the chromatography by thin layer chromatography, utilizing silica gel according to Stahl; $R_f$ (with acetone:benzene (1:1) as a solvent system) =0.51. Visualize under an ultraviolet lamp. Combine like fractions 127–170 and evaporate the combined fractions in vacuo to a residue comprising desevernitrose everninomicin D. Further purify by crystallization from acetone:ethyl acetate (1:9) to obtain desevernitrose everninomicin D as a colorless crystalline solid, m.p. 179°–181°C; Fisher-John block; yield 2.3 g.

Neutralization equivalent = 1410;
pKa=7.5; $[\alpha]_D^{26}$ =−0.5° (c, 1% chloroform); Infrared spectrum (nujol)= 2.9, 3.4, 5.7, 6.1, 6.3, 7.9, 8.3, 9.0, 9.6, 10.2, 10.5, 11.0, 13.5μ).

Infrared spectrum (chloroform): 2.9, 3.3, 3.4, 5.7, 6.2, 6.3, 6.4, 7.1, 7.2, 7.7, 8.0, 9.0, 9.6, 10.3, 10.6, 11.0μ;

Ultraviolet spectrum: $\lambda_{max}^{methanol}$ 205 mμ ($\epsilon$=32783).

In the above procedure instead of triphenyl phosphine, equimolar quantities of other trihydrocarbon-substituted phosphines can be used, e.g. ethyldiphenyl phosphine, and there is obtained desevernitrose everninomicin D.

B. In the procedure of Example 1A, instead of the triphenyl phosphine there may be used 6 ml. (3 moles) of triethyl phosphite. Isolate and purify the resultant product in a manner similar to that described to obtain desevernitrose everninomicin D.

EXAMPLE 2

Desevernitrose Everninomicin B

In a manner similar to that described in Example 1A, treat nitrosoeverninomicin B in benzene under an atmosphere of nitrogen with a larger molar excess of triphenyl phosphine. Isolate and purify the resultant product in a manner similar to that described in Example 1A to obtain desevernitrose everninomicin B as a colorless crystalline solid, m.p. 194°–196°C; Fisher-John block; $[\alpha]_d^{26}$ −2.3° (c, 1% chloroform);

Infrared spectrum: (nujol): 2.9, 3.4, 5.8, 6.4, 8.0, 8.4, 10.3, 10.6, 11.0, 12.8, 13.6$\mu$.

Infrared spectrum: (chloroform): 2.9, 3.3, 5.8, 6.3, 6.9, 7.1, 7.2, 8.0, 8.9, 9.1, 9.6, 10.3, 10.6, 12.4$\mu$.

Ultraviolet spectrum: $\lambda_{max}^{methanol}$ 203 m$\mu$ ($\epsilon$=34150)

EXAMPLE 3

Desevernitrose Everninomicin C

In a manner similar to that described in Example 1A, treat nitrosoeverninomicin C in benzene under an atmosphere of nitrogen with a large molar excess of triphenyl phosphine. Isolate and purify the resultant product in a manner similar to that described in Example 1A to obtain desevernitrose everninomicin C. Infrared Absorption Spectrum: (in chloroform): 2.92, 5.78, 6.33 (weak), 6.90, 7.24, 7.77 (weak), 8.0, 8.53, 9.10, 9.64, 10.29, 11.00, 11.72, 12.01$\mu$; m.p. 198°–200°C, Fisher-John block.

EXAMPLE 4

Cationic Salts of Desevernitrose Everninomicins B, C and D

A. To a vigorously stirred suspension of 1 g. of desevernitrose everninomicin D in 25 ml. of water under an atmosphere of nitrogen, slowly add 0.1N sodium hydroxide (about 6.8 ml.) until the pH of the reaction mixture is 9.5 and the solid is in solution. Stir at room temperature for an additional hour (final pH about 8.5). Lyophilize the clear solution to obtain 0.95 g. of desevernitrose everninomicin D sodium salt.

B. In the above procedure by substituting for the sodium hydroxide equimolar quantities of other alkaline metal hydroxides (e.g. potassium hydroxide and lithium hydroxide) or by alkaline earth metal hydroxides (e.g calcium hydroxide and barium hydroxide), there is obtained the corresponding alkali metal of alkaline earth metal salt, e.g. desevernitrose everninomicin D potassium salt, desevernitrose everninomicin D lithium salt, desevernitrose everninomicin D calcium salt, and desevernitrose everninomicin D barium salt, respectively.

C. In a manner similar to that described in Example 4A, treat each of desevernitrose everninomicin B and desevernitrose everninomicin C with 0.1N sodium hydroxide. Isolate each of the resultant products in a manner similar to that described in Example 4A to obtain desevernitrose everninomicin B sodium salt and desevernitrose everninomicin C sodium salt, respectively.

EXAMPLE 5

N-Methyl-Glucamine Salt of Desevernitrose Everninomicins B, C and D

A. To 300 mg. of desevernitrose everninomicin D dissolved in 1.5 ml. of methanol, add 40 mg. of N-methyl glucamine and stir the reaction mixture at room temperature for 1½ hours. Slowly add ether (40 ml.) with good agitation. Separate the resultant precipitate by filtration and air dry to give 175 mg. of desevernitrose everninomicin D N-methyl glucamine.

B. Similarly, treat each of desevernitrose everninomicins D and desevernitrose everninomicin D with N-methyl glucamine in methanol. Isolate each of the resultant products in a manner similar to that described in Example 5A to obtain desevernitrose everninomicin B N-methyl glucamine and desevernitrose everninomicin C N-methyl glucamine, respectively.

The present invention includes within its scope pharmaceutical compositions comprising one or a mixture of desevernitrose everninomicins B, C and D or of a pharmaceutically acceptable mono-cationic or N-methyl glucamine salt thereof in association with a compatible, pharmaceutically acceptable carrier or coating. Also included within our invention is the method of eliciting an antibacterial response in a warm-blooded animal having a susceptible bacterial infection which comprises administering to said animal a non-toxic antibacterially effective amount of a member selected from the group consisting of desevernitrose everninomicin B, desevernitrose everninomicin C, desevernitrose everninomicin D, and pharmaceutically acceptable mono-cationic and N-methyl glucamine salts of the foregoing.

The compositions may be administered parenterally, orally or topically, parenteral administration being preferred. In carrying out the methods of this invention, the active ingredient is normally combined with conventional pharmaceutical diluents and carriers which are based upon the desired route of administration. The parenteral route is preferred, particularly with salts of desevernitrose everninomicin D, due to the increased absorption and rapid excretion when administered parenterally of desevernitrose everninomicin D and salts thereof as compared with their everninomicin D and nitrosoeverninomicin D precursors. In carrying out the method, the active group can, if desired, be combined with other therapeutically active compositions customarily included in antibacterial formulations.

The individual unit dosage and frequency of administration is determined not only by the nature of severity of the bacterial infection for which relief is sought, but also upon age, weight, species, underlying physical condition and route of administration. The exact amount to be administered should be nontoxic, yet pharmaceutically effective in alleviating the symptoms of bacterial infections. Generally, for the treatment of bacterial infections, the compositions are administered parenterally so as to give a daily dose of from 1 to about 15 mg./kg. of a desevernitrose everninomicin compound of this invention.

The following Examples illustrate pharmaceutical compositions according to the invention.

EXAMPLE 6

Parenteral Solution of Desevernitrose Everninomicin D

|  | mg./ml. |
|---|---|
| Desevernitrose everninomicin D sodium salt | 58.00 |
| Sodium chloride | 5.00 |
| Sodium bisulfite | 1.625 |
| Sodium hydroxide (1N to pH 8.7) | 0.56 |
| Purified Water, q.s. | 1.0 ml. |

PROCEDURE

Sparge with nitrogen about 90% of the required amount of water. With stirring, add the sodium chloride and sodium bisulfite and stir until dissolved. Add the desevernitrose everninomicin D sodium salt and with stirring add 1N sodium hydroxide until the solution reaches a pH of 8.7. Add water to make a total volume of 1 ml. Filter through a sterilizing membrane. with this solution, fill multiple dose vials. Lyophilize.

EXAMPLE 7

Parenteral Solution of Desevernitrose Everninomicin B

|  | mg./ml. |
|---|---|
| Desevernitrose Everninomicin B sodium salt | 58.00 |
| Sodium chloride | 5.0 |
| Sodium bisulfite | 1.625 |
| Sodium hydroxide (1N to pH 8.7) | 0.56 |
| Methylparaben | 1.8 |
| Propylparaben | 0.2 |
| Purified Water, q.s. | 1.0 ml. |

PROCEDURE

Sparge with nitrogen about 90% of the required amount of water and heat the water to a temperature of about 60°–70°C. Add the methylparaben and propylparaben, stir until dissolved, then cool the solution to 25°–30°C. Then follow the procedure described in Example 6.

EXAMPLE 8

Parenteral Suspension of Desevernitrose Everninomicin D

| Parenteral Suspension: | mg./ml. |
|---|---|
| Desevernitrose Everninomicin D | 50. |
| Sodium carboxymethylcellulose | 1.5 |
| Polysorbate 80 U.S.P. | 0.5 |
| Methylparaben | 1.8 |
| Propylparaben | 0.2 |
| Water, q.s. | 1.0 ml. |

PROCEDURE

1. Prepare a solution of sodium carboxylmethylcellulose, Polysorbate 80, U.S.P., methylparaben, and propylparaben.
2. Aseptically, slurry desevernitrose everninomicin D with a portion of the above vehicle and pass through a colloid mill.
3. Mix the milled slurry with the remainder of the vehicle.
4. Fill into sterile vials.

We claim:

1. A compound selected from the group consisting of desevernitrose everninomicin B, desevernitrose everninomicin C, desevernitrose everninomicin D, and pharmaceutically acceptable phenolic mono-cationic salts and N-methyl glucamine acid addition salts of the foregoing.

2. A compound of claim 1 selected from the group consisting of a desevernitrose everninomicin represented by the following formula and the pharmaceutically acceptable, phenolic mono-cationic salts and N-methyl glucamine acid addition salts thereof:

wherein X is a member selected from the group consisting of hydrogen and hydroxyl; Y is a member selected from the group consisting of $$-CH{\scriptstyle\begin{array}{l}CH_3\\OCH_3\end{array}}$$

and hydrogen provided X is hydrogen; and said pharmaceutically acceptable salts are salts of the phenol substituent in said desevernitrose everninomicin.

3. A compound of claim 2 wherein X is hydroxyl and Y is $$-CH{\scriptstyle\begin{array}{l}CH_3\\OCH_3\end{array}}$$

said compound being desevernitrose everninomicin B, effective in inhibiting the growth of gram-positive bacteria and having the following physical characteristics: a specific rotation of about −2.3°C as measured in chloroform at 1% concentration by the D-line of sodium about 26°C; a melting point of about 194°–196°C when measured on a Fisher-John block; has an ultraviolet absorption maxima at 203 m$\mu$ with $\epsilon$ in methanol equal to about 34150; has an infrared spectrum when dissolved in chloroform with peaks at about 2.9, 3.3, 5.8, 6.3, 6.9, 7.1, 7.2, 8.0, 8.9, 9.1, 9.6, 10.3, 10.6, 12.4$\mu$; has an infrared spectrum when suspended in nujol with peaks at about 2.9, 3.4, 5.8, 6.4, 8.0, 8.4, 10.3, 10.6, 11.0, 12.8, 13.6$\mu$; has an antibacterial spectrum including the bacteria enumerated in Table I.

4. A compound of claim 2 wherein X and Y are each hydrogen, said compound being desevernitrose everninomicin C, effective in inhibiting the growth of gram-positive bacteria and having the following physical characteristics: a melting point of about 198°–200°C when measured on a Fisher-John block; and having an infrared spectrum when dissolved in chloroform having peaks at about 2.92, 5.78, 6.33 (weak), 6.90, 7.24, 7.77 (weak), 8.0, 8.53, 9.10, 9.64, 10.29, 11.00, 11.72, 12.01μ.

5. A compound of claim 2 wherein X is hydrogen and Y is $$-CH\begin{matrix}CH_3\\OCH_3\end{matrix}.$$

said compound being desevernitrose everninomicin D, effective in inhibiting the growth of gram-positive bacteria and having the following physical characteristics: a specific rotation of about −0.5°C as measured in chloroform at 1% concentration by the D-line of sodium at 26°C; a melting point of about 179°–181°C when measured on a Fisher-John block; a neutralization equivalent equal to 1410; a pKa = 7.5; has an ultraviolet absorption maxima at 205 mμ with ε in methanol equal to about 32783; has an infrared spectrum when dissolved in chloroform having peaks at about 2.9, 3.3, 3.4, 5.7, 6.2, 6.3, 6.4, 7.1, 7.2, 7.7, 8.0, 9.0, 9.6, 10.3, 10.6, 11.0μ; has an infrared spectrum when suspended in nujol with peaks at about 2.9, 3.4, 5.7, 6.1, 6.3, 7.9, 8.3, 9.0, 9.6, 10.2, 10.5, 11.0, 13.5μ; has an antibacterial spectrum including the bacteria enumerated in Table I.

6. A compound of claim 2 which is the sodium salt of a desevernitrose everninomicin represented by the formula therein.

7. A compound of claim 2 which is the N-methylglucamine acid addition salt of a desevernitrose everninomicin represented by the formula therein.

8. A compound of claim 2 which is the sodium salt of desevernitrose everninomicin D.

9. A compound of claim 2 which is the N-methylglucamine acid addition of desevernitrose everninomicin D.

10. A compound of claim 2 which is the sodium salt of desevernitrose everninomicin B.

11. The process for preparing a desevernitrose everninomicin selected from the group consisting of desevernitrose everninomicin B, desevernitrose everninomicin C and desevernitrose everninomicin D which comprises treating the corresponding nitrosoeverninomicin selected from the group consisting of nitrosoeverninomicin B, nitrosoeverninomicin C and nitrosoeverninomicin D in an aromatic hydrocarbon solvent under an inert atmosphere with at least an equimolar quantity of a trisubstituted trivalent-phosphorus reagent selected from the group consisting of a tri-hydrocarbon phosphite and a tri-hydrocarbon phosphine, said hydrocarbon being an alkyl or an aryl radical having up to 8 carbon atoms.

12. The process of claim 11 wherein said tri-substituted phosphorus reagent is triethyl phosphite or triphenyl phosphine.

13. The process of claim 11 wherein said solvent is benzene, said inert atmosphere is nitrogen and said trisubstituted phosphorus reagent is triphenyl phosphine.

* * * * *

UNITED STATES PATENT OFFICE
CERTIFICATE OF CORRECTION

PATENT NO. : 3,920,629
DATED : November 18, 1975
INVENTOR(S) : Ashit K. Ganguly et al It is certified that error appears in the above-identified patent and that said Letters Patent are hereby corrected as shown below:

Column 14, lines 14 and 15, "desevernitrose everninomicins D and desevernitrose everninomicin D" should read ---desevernitrose everninomicin B and desevernitrose everninomicin C---.

Signed and Sealed this

Tenth Day of August 1976

[SEAL]

Attest:

RUTH C. MASON
Attesting Officer

C. MARSHALL DANN
Commissioner of Patents and Trademarks